United States Patent [19]
Nagai et al.

[11] 3,846,463
[45] Nov. 5, 1974

[54] PROCESS FOR PRODUCING ALKOXYSILANE

[75] Inventors: Yoichiro Nagai; Iwao Ojima; Tetsuo Kogure, all of Sagamihara, Japan

[73] Assignee: Sagami Chemical Research Center, Tokyo, Japan

[22] Filed: Aug. 17, 1973

[21] Appl. No.: 389,133

[30] Foreign Application Priority Data
Aug. 24, 1972 Japan.............................. 47-84094

[52] U.S. Cl........................ 260/448.8 R, 252/431 P
[51] Int. Cl.............................................. C07b 7/18
[58] Field of Search .......... 260/448.8 R; 252/431 P, 252/437

[56] References Cited
UNITED STATES PATENTS

| | | | |
|---|---|---|---|
| 2,438,520 | 3/1948 | Robie et al............... | 260/448.8 R X |
| 2,438,736 | 3/1948 | Barry....................... | 260/448.8 R X |
| 2,967,171 | 1/1961 | Barnes et al. ............ | 260/448.8 R X |
| 3,354,101 | 11/1967 | Williams et al. ......... | 260/448.8 R X |
| 3,467,685 | 9/1969 | Milbert et al. ........... | 260/448.8 R X |

*Primary Examiner*—Daniel E. Wyman
*Assistant Examiner*—Paul F. Shaver
*Attorney, Agent, or Firm*—Oblon, Fisher, Spivak, McClelland & Maier

[57] ABSTRACT

Alkoxysilanes are produced by reacting an organosilicon hydride with an alcohol in the presence of tris(triphenylphosphine) chlororhodium.

10 Claims, No Drawings

PROCESS FOR PRODUCING ALKOXYSILANE

BACKGROUND OF THE INVENTION

1. Field of the Invention

This invention relates to a process for producing an alkoxysilane and more particularly, it relates to a process for producing an alkoxysilane by reacting an organosilicon hydride with an alcohol.

2. Description of the Prior Art

Alkoxysilanes have been widely used in industry as a water proofing agent, a silicone lacquer, a siloxane polymer plasticizer, a polymer transparency increasing agent, or a starting material for siloxane polymers. Dimethyldialkoxysilane is especially important as a starting monomer in the preparation of silicon resins.

Moreover, the alkoxysilanes are thermally stable and have a suitable vapor pressure so that they are readily analyzed by gas chromatography and mass spectrography. Accordingly, various compounds having active hydrogen, which can not be analyzed by gas chromatography or mass spectrography, can be analyzed using these techniques by converting them to the corresponding silyl compounds.

Trimethylsilylations using T M S agents such as trimethylchlorosilane, hexamethyldisilazane, bis(trimethylsilyl) acetoamide, N-trimethylsilyl imidazol etc., are known and widely used. For example, the silylation for protecting functional groups in the synthesis of peptides, nucleocides or nucleotides is known.

The use of conventional silylation agents result in the production of undesirable by-products which must be removed from the reaction system and therefore complicate the reaction. A need exists, therefore, for a simplified silylation method which does not produce undesirable by-products. This need is met by the disclosed process.

Typical processes are the following:

1. a process for producing alkoxysilanes by reacting a chlorosilane with an alcohol is shown by C. Eaborn, "Organosilicon Compounds" Butterworths, London, 1960 P. 288;
2. a process for producing alkoxysilanes by reacting an organosilicon hydride with an alcohol in the presence of a metal is shown by, e.g., B. N. Dolgov, N. P. Kharitonov and M. G. Voronkov, Zhur, Obshchei Khim, 24 1178 (1954);
3. a process for producing alkoxysilanes by reacting a trimethyl silylating agent e.g. trimethyl chlorosilane, hexamethyldisilazane etc. with an alcohol is shown by Bunji Shimizu, Yuki Gosei Kagaku 28 860 (1970).

However, these conventional processes have various disadvantages.

The process of (1) is given by the reaction formula:

This is a reversible reaction in which one equivalent of HCl is formed as by-product per equivalent of the starting material. The HCl dissolves in the alcohol resulting in the decomposition of the desired silylether. Accordingly, it is necessary to remove the generated HCl in order to obtain the desired silylether. This is accomplished in the conventional process by adding a basic material to the reaction system. At least one equivalent of basic material per equivalent of HCl is required. However, the addition of the basic material complicates the operation of the reaction system.

In process (2), various types of metals can be used. However, when these metallic catalyst are used the reaction velocity is too slow. Therefore, large quantities of the metal catalysts and high reaction temperatures are required. Hence the process can not be applied as an industrial process.

The process of (3) has been applied to peptides, nucleocides, or nucleotides, and secharoses steroids. However, this process has the same disadvantages as process (1) in that 1 equivalent of ammonia acetoamide, imidazol, etc. is formed as a by-product.

According to the present invention, there is provided a process which overcomes these disadvantages and produces alkoxysilanes having high purity in high yield by an industrial advantageous process from an organosilicon hydride (hydroxysilane) and an alcohol.

SUMMARY OF THE INVENTION

One object of this invention is to provide a process for producing an alkoxysilane having high purity in high yield by an industrially advantageous process from an organosilicon hydride and an alcohol.

Briefly, these and other objects of the invention, as hereinafter will become apparent, are achieved, by producing an alkoxysilane by reacting an organosilicon hydride with an alcohol in the presence of tris(triarylphosphine) halorhodium such as tris(triphenylphosphine) chlororhodium.

DETAILED DESCRIPTION OF THE PREFERRED EMBODIMENTS

It has now been found that a tris(triarylphosphine) halorhodium such as tris(triphenylphosphine chlororhodium is an effective catalyst for the reaction of an organosilicon hydride with an alcohol. This compound catalyst is known as wilkinson catalyst which has been used for hydrogenation, decarbonylation, oxidation, and carbonylation. However, it has been previously unknown to use these compounds as catalyst in the silylation of alcohols.

The reaction of the invention proceeds substantially stoichiometrically. The amount of organosilicon hydride and alcohol employed is dependent upon the alkoxysilanes desired, i.e. monoalkyloxysilanes, dialkoxysilanes or trialkoxysilanes. The molar ratio of alcohol to organosilicon hydride for obtaining the desired alkoxysilanes will be understood from the following formulas. The molar ratio of alcohol to organosilicon hydride is therefore respectfully 3, 2, or 1 wherein the tri, di or mono-alkoxysilane are desired.

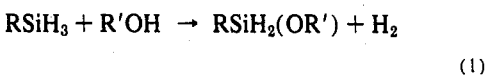

(1)

(2)

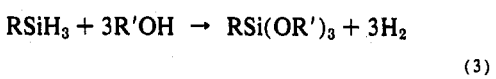

(3)

(4)

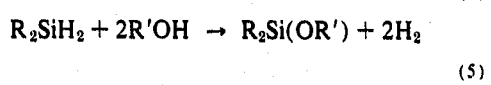

(5)

$$R_3SiH + R'OH \rightarrow R_3Si(OR') + H_2 \qquad (6)$$

As is clear from the reaction formulas, $H_2$ is the only by-product so that purification is quite simple.

In addition, the tris(triphenylphosphine) chlororhodium catalyst can be readily separated from the reaction system. Moreover, an extremely small amount of catalyst is used and the reaction is completed in a short period of time in comparison with the prior art processes. The alcohols used can be aliphatic alcohols particularly the lower alkanols of 1–6 carbon atoms, e.g., methylalcohol, ethyl alcohol, isopropyl, etc., aromatic alcohols, e.g., phenol, dihydroxy benzene, etc. of alicyclic alcohols, e.g., menthol, etc., polyalcohols, e.g., ethylene glycol and saccharose, etc.

The organosilicon hydrides used can be trialkyl monohydrosilane, triaryl monohydrosilane, aryldialkyl monohydrosilane, diarylalkyl monohydrosilane, diaralkyl monohydrosilane, diaryl dihydrosilane, arylalkyldihydrosilane, dialkyl dihydrosilane, aryl trihydrosilane, alkyl trihydrosilane, etc..

As noted, water repellent silicon resins for fiber processing are produced by the condensation of methyl dialkoxysilane. The methyl dialkoxysilane has heretofore been prepared by a complex multi-stage process in which methyl dichlorosilane is reacted with an alcohol. The methyl dichlorosilane is prepared by reducing methyltrichlorosilane with NaH to produce methylsilane and reacting the methylsilane with methyl trichlorosilane in the presence of an aluminum chloride as catalyst. [R. R. Gibert, G. D. Cooper, and R. W. Schecle, Ind. Eng. Chem., 51 665 (1959)]. These reactions are represented by the following formulas:

Conventional Process $$MeSiCl_3 \xrightarrow{NaH} MeSiH_3 \qquad (i)$$

$$MeSiH_3 + MeSiCl_3 \xrightarrow{A \cdot C} MeSiHCl_2 \qquad (ii)$$

$$MeSiHCl_2 \; 2ROH \rightarrow MeSiH(OR)_2 + 2HCl \qquad (iii)$$

The process of the invention shown by the following formula is much simpler in that at least one step can be reduced from the viewpoint of the reaction formulas of the process. When the necessary separation and purification steps are considered, as well as the removal of HCl, it becomes apparent that the process according to the invention is remarkably simpler and superior to the conventional processes.

The Invention $$MeSiH_3 + 2ROH \xrightarrow{Catalyst} MeSiH(OR)_2 + 2H_2$$

The process of the invention can be carried out in the liquid phase or in the vapour phase, in a batch process or in a continuous process. The amount of catalyst, the reaction temperatures and the reaction time may vary over a wide range as will become apparent from the specific examples. The reaction proceeds smoothly and a yield of essentially 100 percent is obtained.

Having generally described the invention, a further understanding can be obtained by certain specific examples which are provided herein for purposes of illustration only and are not intended to be limiting in any manner.

EXAMPLE 1

A mixture of 10.8 g (0.1 mol.) of phenylsilane and 12.0 g (0.2 mol.) of isopropylalcohol was cooled with ice and 9.5 mg (0.01 mol. percent) of tris(triphenylphosphine) chlororhodium was added to the mixture with stirring. The reaction proceeded with the generation of hydrogen for ten minutes after which time the reaction was determined to be complete by VPC monitoring. The reaction product was directly distilled under reduced pressure to obtain 22.2 g of phenyl diisopropoxysilane having a boiling point of 120°C/35 mm Hg. (yield 99 percent). Incidentally, the catalyst could be separated by a filtration, after the reaction.

EXAMPLE 2

A mixture of 8.8 g (0.1 mol.) of diethylsilane and 6.4 g (0.2 mol.) of methanol was cooled with an ice bath and 9.5 mg (0.01 mol. percent) of tris(triphenylphosphine) chlororhodium was added to the mixture with stirring. The reaction proceeded smoothly accompanied by evolution of hydrogen and was completed after 10 minutes. After filtering the catalyst, the reaction mixture was distilled to obtain 14.6 of diethyl dimethoxysilane having boiling point of 120°C (yield 99 percent).

EXAMPLE 3

A mixture of 18.4 g (0.1 mol.) of diphenylsilane and 15.6 g(0.1 mol.) of menthol was admixed with 9.2 mg of tris(triphenylphosphine) chlororhodium with stirring. The reaction was smoothly performed at room temperature and the generation of hydrogen ceased after 10 minutes.

N-Hexane was added to the reaction mixture and the catalyst was separated by filtration and the filtrate was condensed and distilled under reduced pressure to obtain 33.3 g of methyloxydiphenylsilane having boiling point of 140°C/0.18 mm Hg. (yield 99 percent).

Various alkoxysilanes were produced in accordance with the processes of the above Examples under the reaction condition as defined in the following examples.

| Example | Organosilicon hydride (equ.) | Alcohol (equ.) | Reaction condition | Catalyst (mol percent) | Product | Boiling point (° C./mm. Hg) | Yield (percent) |
|---|---|---|---|---|---|---|---|
| 4 | Et$_3$SiH (1) | EtOH (1) | 70° C., 30 min | 0.5 | Et$_3$SiOEt | 67/40 | 100 |
| 5 | Ph$_3$SiH (1) | EtOH (1) | 60° C., 30 min | 1.0 | Ph$_3$SiOEt | 125/0.1 | 100 |
| 6 | PhMe$_2$SiH (1) | MeOH (1) | Reflux, 15 min | 0.1 | PhMe$_2$SiOMe | 51/5 | 100 |
| 7 | (n-Pr)$_3$SiH (1) | MeOH (1) | do | 0.1 | (n-Pr)$_3$SiOMe | 60/6 | 100 |
| 8 | PhMe$_2$SiH (1) | PhOH (1) | 60° C., 10 hrs | 0.01 | PhMe$_2$SiOPh | 106/2 | 100 |
| 9 | Et$_2$SiH$_2$ (1) | EtOH (1) | Ice cooling, 10 min | 0.01 | Et$_2$SiH(OEt) | 112° C. | 100 |
| 10 | Et$_2$SiH$_2$ (1) | 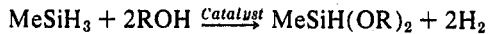 (1) | Room temperature, 10 min | 0.01 | Et$_2$HSiO-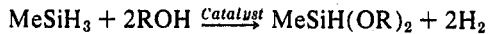 | 113/18 | 100 |

| Example | Organosilicon hydride (equ.) | Alcohol (equ.) | Reaction condition | Catalyst (mol percent) | Product | Boiling point (° C./ mm. Hg) | Yield (percent) |
|---|---|---|---|---|---|---|---|
| 11 | $Ph_2SiH_2$ (1) | MeOH (1) | Ice cooling, 5 min | 0.01 | $Ph_2SiH(OMe)$ | 92.5/0.26 | 100 |
| 12 | $Ph_2SiH_2$ (1) | MeOH (2) | Ice cooling −70° C., 30 min | 0.01 | $Ph_2Si(OMe)_2$ | 103/0.3 | 98 |
| 13 | $Ph_2SiH_2$ (1) | PhOH (1) | 40° C., 1 hr | 0.05 | $Ph_2SiH(OPh)$ | 152/0.33 | 98 |
| 14 | $Me_2SiH_2$ (1) | MeOH (2) | −30° C.~0° C., 30 min | 0.01 | $MeSi(OMe)_2$ | 80° C. | 100 |
| 15 | $MeSiH_3$ (1) | iso-PrOH (2) | −56°~0° C., 30 min | 0.01 | $MeSiH(OPr-iso)_2$ | 126° C. | 100 |
| 16 | $MeSiH_3$ (1) | iso-PrOH (3) | −56° C.-room temp., 30 min | 0.01 | $MeSi(OPr-iso)_3$ | 69/20 | 100 |
| 17 | $PhSiH_3$ (1) | MeOH (2) | Ice cooling, 10 min | 0.01 | $PhSiH(OMe)_2$ | 83/28 | 100 |
| 18 | $PhSiH_3$ (1) | PhOH (2) | do | 0.01 | $PhSiH(OPh)_2$ | 146/0.6 | 100 |

Having now fully described the invention, it will be apparent to one of ordinary skill in the art that many changes and modifications can be made thereto without departing from the spirit or scope of the invention as set forth herein.

What is deemed as new and desired to be secured by Letters Patent is:

1. A process for producing an alkoxysilane which comprises reacting an organosilicon hydride selected from the group consisting of trialkyl monohydrosilanes, triphenyl monohydrosilanes, diphenylalkyl monohydrosilanes, dialkylphenyl monohydrosilanes, diphenyl dihydrosilanes, phenylalkyl dihydrosilanes, dialkyl dihydrosilanes, phenyl trihydrosilanes, and alkyl trihydrosilanes with an alcohol selected from the group consisting of aliphatic alcohols having 1 to 6 carbon atoms, aromatic alcohols, alicyclic alcohols, and polyalcohols in the presence of tris(triphenylphosphine) halorhodium.

2. The process of claim 1 wherein the alcohol is phenol or dihydroxy benzene.

3. The process of claim 1, wherein the polyalcohol is ethylene glycol or saccharose.

4. The process according to claim 1, wherein tris(-triarylphosphine) halorhodium is tris(triphenylphosphine) chlororhodium.

5. The process of claim 1, wherein the ratio of alcohol to organosiliconhydride is from 3 : 1 to 1 : 1.

6. The process or claim 1, wherein the amount of the tris(trarylphosphine) halorhodium is from about 0.01 to 1 mole percent.

7. The process of claim 1 wherein the tris(triarylphosphine) halorhodium is tris(triphenylphosphine) chlororhodium and the alcohol is menthol, and the organosilicon hydride is diethyl-dihydrosilane.

8. The process of claim 1 wherein the alicyclic alcohol is menthol.

9. The process of claim 1 wherein the organosilicon hydride is selected from the group consisting of phenylsilane, diethylsilane, diphenylsilane, triethylsilane, triphenylsilane, phenyldimethylsilane, and tripropylsilane.

10. The process of claim 1, wherein the alcohol is selected from the group consisting of isopropyl alcohol, methanol, menthol, phenol, and ethanol.

* * * * *